United States Patent [19]

Lassiere

[11] 3,979,136
[45] Sept. 7, 1976

[54] FOLDABLE BICYCLE

[75] Inventor: Alan Lassiere, Leatherhead, England

[73] Assignee: A. Lassiere Ltd., Leatherhead, England

[22] Filed: Dec. 16, 1974

[21] Appl. No.: 533,009

[30] Foreign Application Priority Data
June 3, 1974 United Kingdom............... 24472/74

[52] U.S. Cl.................................. 280/278; 280/236
[51] Int. Cl.² ...................................... B62K 15/00
[58] Field of Search ........... 280/278, 287, 281, 236; 180/33 R

[56] References Cited
UNITED STATES PATENTS

| 574,818 | 1/1897 | Pennington ........................ 180/33 R |
| 1,428,496 | 9/1922 | Roquefort-Villeneuve......... 280/278 |
| 1,584,314 | 5/1926 | Mamiya.............................. 280/278 |
| 1,610,016 | 12/1926 | Kuchta............................... 280/278 |
| 2,179,764 | 11/1939 | Steinlein et al. ................... 180/33 R |
| 2,619,364 | 11/1952 | Carson................................ 280/287 |
| 2,777,711 | 1/1957 | Yokomaki .......................... 280/287 |
| 3,408,090 | 10/1968 | Fritz et al. .......................... 280/287 |
| 3,486,765 | 12/1969 | Turner................................ 280/278 |
| 3,572,757 | 3/1971 | Camps................................ 280/278 |
| 3,623,749 | 11/1971 | Jensen ................................ 280/278 |
| 3,710,883 | 1/1973 | Rizzo ................................. 280/278 |
| 3,863,521 | 2/1975 | Gatsos et al. ....................... 280/278 |

Primary Examiner—M. H. Wood, Jr.
Assistant Examiner—Jack D. Rubenstein
Attorney, Agent, or Firm—Charles E. Baxley

[57] ABSTRACT

This disclosure teaches a foldable bicycle divided into a front frame part and a rear frame part. The front frame part and the rear frame part are hingedly connected together. A front fork and steering assembly is hingedly connected to the front frame part. A saddle supporting assembly is hingedly connected to the rear frame part. Locking means are provided in operative association with each of the hinged connections.

14 Claims, 7 Drawing Figures

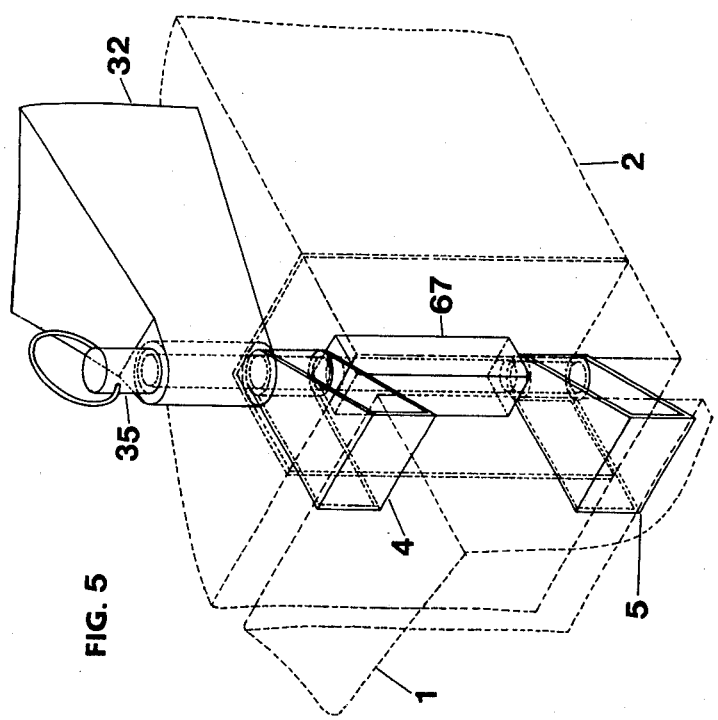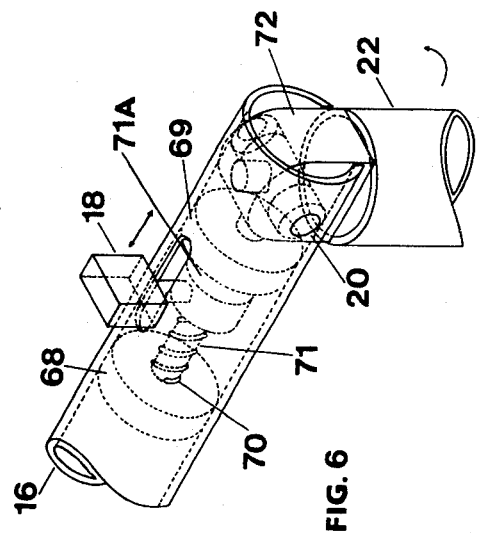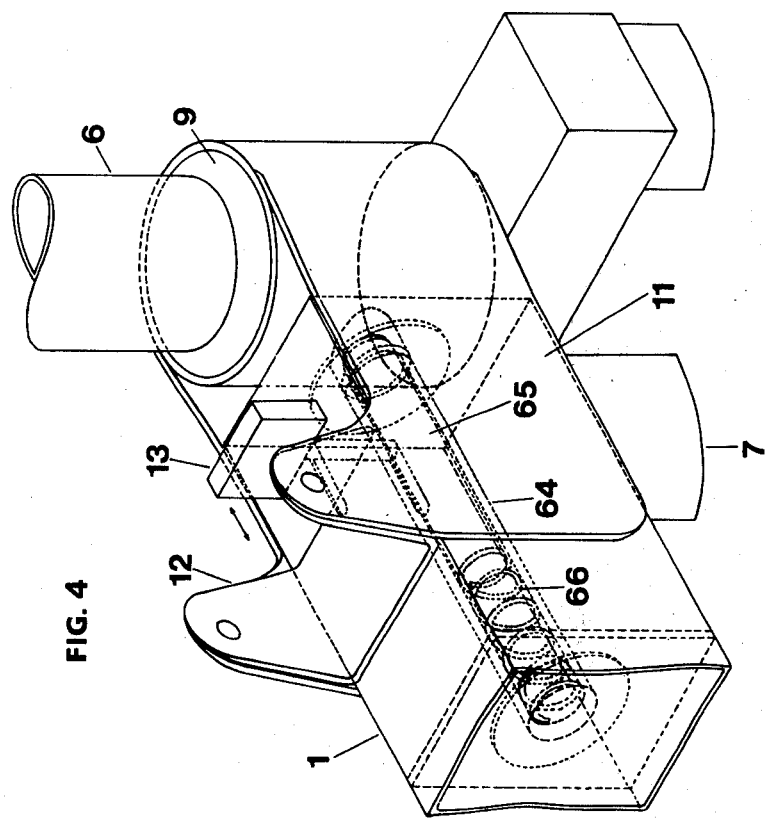

FOLDABLE BICYCLE

BACKGROUND OF INVENTION

This invention relates to a foldable bicycle. A number of designs of foldable bicycles are known and several of these rely on provision of hinges in a conventional bicycle frame of diamond configuration. In addition, some of these designs provide for turning of handlebars into the plane of the frame. Because the wheels are of standard diameter (i.e., approximately 26 inches) and because the pedals still project at right angles to the plane of the frame, the folded dimensions of these bicycles are not such as to permit easy carrying and storage in confined spaces. In these designs the folding is essentially an afterthought applied to a bicycle of conventional configuration.

Other known designs provide for foldable elements such as handlebars and/or pedals, without folding the main frame.

Yet other known designs provide for telescoping or folding of some elements (e.g. handlebars and saddle tube) and of the main frame at one point, and employ small wheels to reduce the folded dimensions. Such designs realize some, but not all, the potential reduction in folded dimensions achievable by (a) multiple folding of the main frame, and of certain components, and (b) use of small wheels.

STATEMENT OF INVENTION

It is among the objects of the present invention to provide a foldable bicycle which overcomes, or substantially reduces, the disadvantages of known foldable bicycles.

According to the present invention, there is provided a portable foldable bicycle divided into a front frame part and a rear frame part. The front frame part and the rear frame part are hingedly connected together. A front fork and steering assembly is hingedly connected to the front frame part. A saddle supporting assembly id hingedly connected to the rear frame part. Locking means are provided in operative association with each of the hinged connections.

DESCRIPTION OF DRAWINGS

The invention is illustrated by way of example in the accompanying drawings in which:

FIG. 4 is a perspective view, on an enlarged scale, of the connection between the main frame and the front fork assembly.

FIG. 5 is a perspective view, on an enlarged scale, of the main frame locking means.

FIG. 6 is a perspective view, on an enlarged scale, of the locking means between the fixed and folding parts of the handlebars.

DESCRIPTION OF PREFERRED EMBODIMENT

Figure 1:
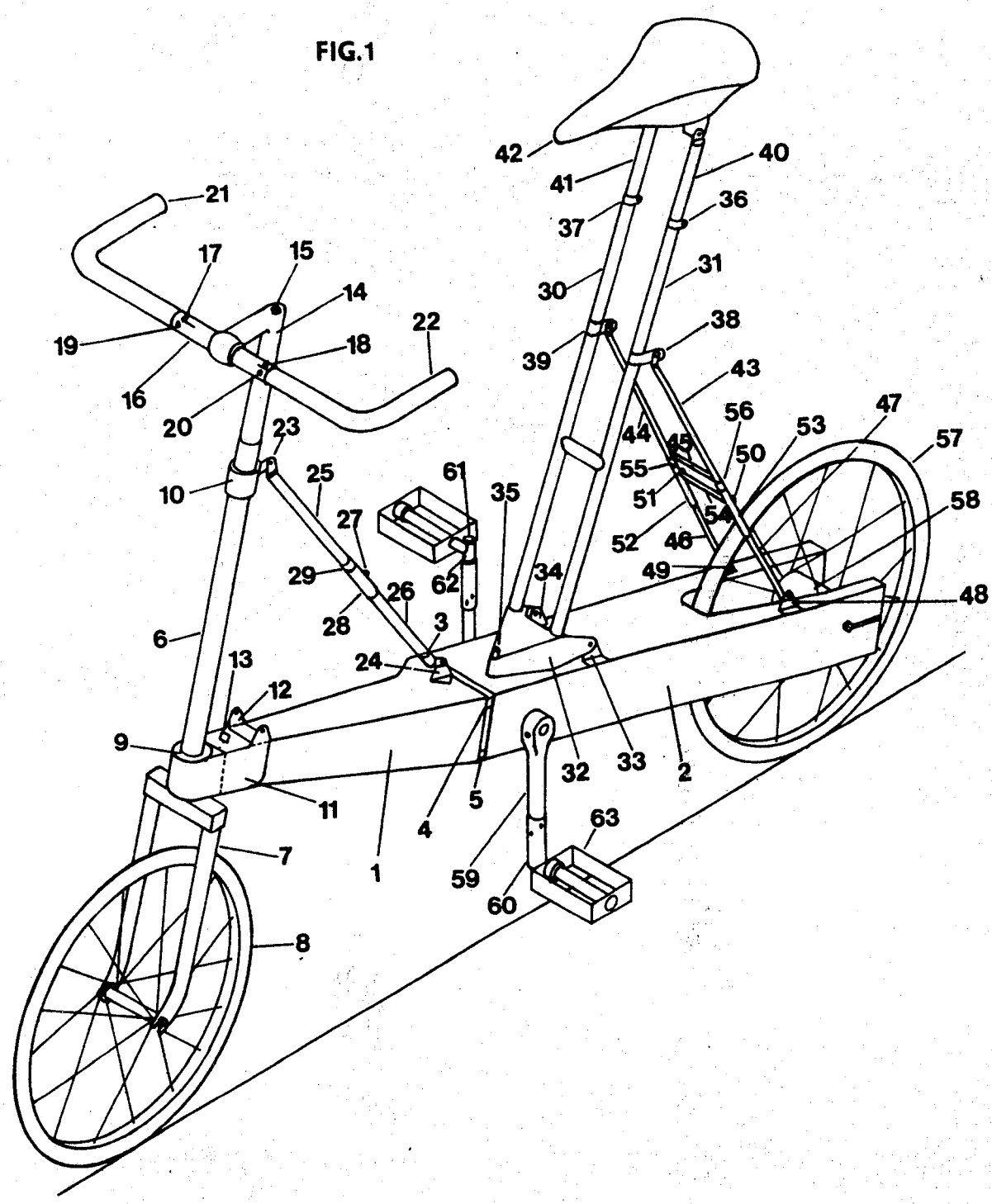
FIG. 1 is a perspective view of a bicycle according to the invention in a normal unfolded condition.

Referring to the drawings it will be noted that for the sake of clarity standard parts such as brake levers, brake cables, and caliper brakes on the front and rear wheels; gear lever and gear cable; mudguards; front and rear lights; and reflectors, have been omitted.

As shown in the drawings, the portable folding bicycle comprises a main frame divided, approximately at midpoint, into a front frame part 1 and a rear frame part 2 which are hingedly connected by means of a hinge pin 3. The adjoining face of the frame part 1 is provided with apertured lugs 4 and 5 which extend into corresponding openings in the frame part 2. A locking pin 35 is provided to pass through the lugs 4 and 5, and through correspondingly positioned holes in the frame part 2, and serves to lock the frame parts 1 and 2 together.

The main frame is built up from sheet metal sections riveted, spot welded, or bolted, together. Alternatively the main frame may be of a reinforced synthetic plastics material. The frame so constructed may have transverse reinforcing webs in order to increase the rigidity and strength thereof at selected points of the application of load.

Preferably the front frame part 1 is about 4 inches wide and has a depth of about 3 inches where it joins the rear frame part 2. The part 1 also tapers to a width of about 1½ inches and a depth of about 2 inches at its front end. In addition, the frame part 1 is asymmetrical (when viewed in plan) to accommodate, as hereinafter described, the pedal and crank when the front frame part 1 is turned through 180° to lie alongside the rear frame part 2 in the folded position.

Preferably also the rear frame part 2 has a width of about 4 inches where it joins the front part 1, increasing to about 4½ inches at its rear end. The part 2 has a depth of about 3 inches throughout its length.

The front end of the front frame part 1 has attached thereto a front fork and steering assembly which comprises a wheel 8 of about 12–18 inches diameter and mounted in forks 7, a front tube 6 and a pair of handlebars attached to the tube 6. This assembly is rotatable about its own axis for steering purposes by means of a pair of thrust bearings provided in a housing 9 attached to the front frame part 1 by means of a bracket 11 and a bracket 12 fixed to the part 1, both brackets 11 and 12 having a common pivotal axis about which the front fork assembly can be turned for folding purposes.

As can be seen in FIG. 4, relative angular movement between the front frame part 1 and the front fork assembly is normally prevented by means of a locking pin 65 arranged in a guide tube 64 in the front frame part 1, the pin being urged by a compression spring 66 into an opening formed in the housing 9. A releasing knob 13 is attached to the pin 65 to withdraw the latter against the action of the spring 66 for folding purposes as hereinafter described.

The handlebars comprise a stem 14, a fixed portion 16 and two cranked gripping parts 21 and 22. The stem 14 is received in a bearing 10 provided at the upper end of the front tube 6 and adjustment of the height of the handlebars can be effected, in well known manner, by slackening a nut 15 and telescoping the stem 14 into the tube 6.

The gripping parts 21 and 22 of the handlebars are hingedly connected at 19 and 20 to the ends of the fixed portion 16 and are each normally held in an operative position by a plunger 71 which engages a lug 72 formed on the ends of the respective parts 21 and 22 as best seen in FIG. 6. Each plunger 71 is slidable in apertures formed in collars 68 and 69 positioned in the fixed portion 16 and is urged into an operative position by a compression spring 70 positioned between the collar 68 and an annular projection 71A formd thereon. Knobs 17 and 18 are fixed to the respective projections 71A and serve to release the plungers to allow folding of the parts 21 and 22.

A foldable front stay consisting of first and second stay parts 25 and 26 is hingedly connected at its ends respectively to a lug 23 provided on the bearing 10 and a bracket 24 attached to the rear end of the front frame part 1. The first and second stay parts 25, 26 are hingedly connected at 27, the two parts normally being held in an in line position by means of a spring loaded sleeve 28 which engages a coacting collar 29 and prevents relative angular movement between the parts 25 and 26.

A saddle supporting assembly is mounted on the rear frame part 2 and comprises a base bracket 32 hingedly connected to spaced brackets 33, 34 fixed to the frame part 2; a pair of spaced seat tubes 30, 31 extending from the bracket 32; and a pair of secondary tubes 40, 41 attached to the saddle 42; the tubes 40, 41 being received in the tubes 30, 31 via locking collars 36, 37 which permit the height of the seat to be adjusted in known manner.

A foldable rear stay extends between lugs 38 and 39 provided on the seat tubes 30, 31 and a pair of brackets 48 and 49 provided on the rear end of the frame part 2 which at this point is bifurcated to provide a rear fork to receive a rear wheel 57 of the same size as that of the front wheel, and which may include a conventional three speed hub 58. In this respect, the inner faces of the rear fork contain a removable stiffening strip with elongated holes at the wheel location to allow for axial movement of the rear wheel 57 for the purpose of chain tension adjustment.

The rear stay comprises a first part consisting of spaced rods 43, 44 interconnected at their lower ends by a cross tube 45 and hingedly connected at their upper ends to the lugs 38, 39. The rear stay also includes a second part consisting of spaced rods 46, 47 hingedly connected at their upper ends at 50 and 51 to the rods 43, 44 and at their lower ends to the brackets 48, 49. The upper ends of the rods 46, 47 are also provided with spring loaded locking sleeves 52, 53 which are interconnected by a cross tube 54 and coact with collars 55, 56 provided on the rods 43, 44 to maintain the first and second parts of the rear stay in an in line position.

In addition to locking the parts 1 and 2 together, the locking pin 35, which passes through a block 67 in the part 2, is also passed through a hole in the base bracket 32 to maintain the saddle supporting assembly in an operative position.

The rear frame part 2 also supports a pair of pedals each comprising a crank 59 having a spigot 61 at its free end and a rotatable collar 62 mounted on the spigot 61. The collar 62 has a threaded housing with its axis at 90° to the crank axis and a standard pedal 63 is screwed into the threaded housing. A spring loaded sleeve 60 is provided with pins which locate in holes formed in the rotatable collar 62 to lock the pedal 63 in the folded or unfolded positions.

Drive between the pedals and the rear wheel is effected by conventional chain 75 and sprockets 76. However, the front sprocket 76 is of similar size to that of the rear sprocket (not shown), rather than being provided with a larger number of sprocket teeth in the manner of a conventional bicycle. Also, the rear wheel is smaller than that of a conventional bicycle. For these two reasons, one revolution of the pedal cranks will not advance the bicycle of the present invention as far as one revolution of the pedal cranks of a standard bicycle. To obtain a comparable advance per pedal crank revolution, a step up gear train 78 is employed.

The aforementioned gear train 78 comprises a spur gear 79 fixed inside the rear frame part 2 on a shaft 80 carrying the pedal cranks 59. A needle roller bearing 81 is mounted on the shaft 80, and the housing of this bearing carries a small spur gear wheel 82 and the chain sprocket 76. A lay shaft 84 is mounted within the part 2 and parallel to, and to the rear of, the pedal shaft 80 and a needle bearing 85 is mounted on the lay shaft 84. The housing of the needle bearing 85 carries a spur gear 86 and a second and smaller spur gear 87. The gear 79 fixed to the pedal shaft 80 meshes with the smaller gear 87 on the lay shaft 84, and the larger gear 86 on the lay shaft 84 meshes with the small gear 82 on the pedal shaft 80. Thus the chain sprocket 76 on the pedal shaft 80 rotates coaxially with the pedal shaft 80, but it has an angular velocity about five times greater than that of the pedal shaft 80. The step up achieved depends on the number of teeth on the four gear wheels in the train. Conventional gear ratios are provided by the three speed hub mounted in the rear wheel. The pedal shaft 80 is mounted in bearings 77 fixed internally of the rear frame part 2.

Figure 2:
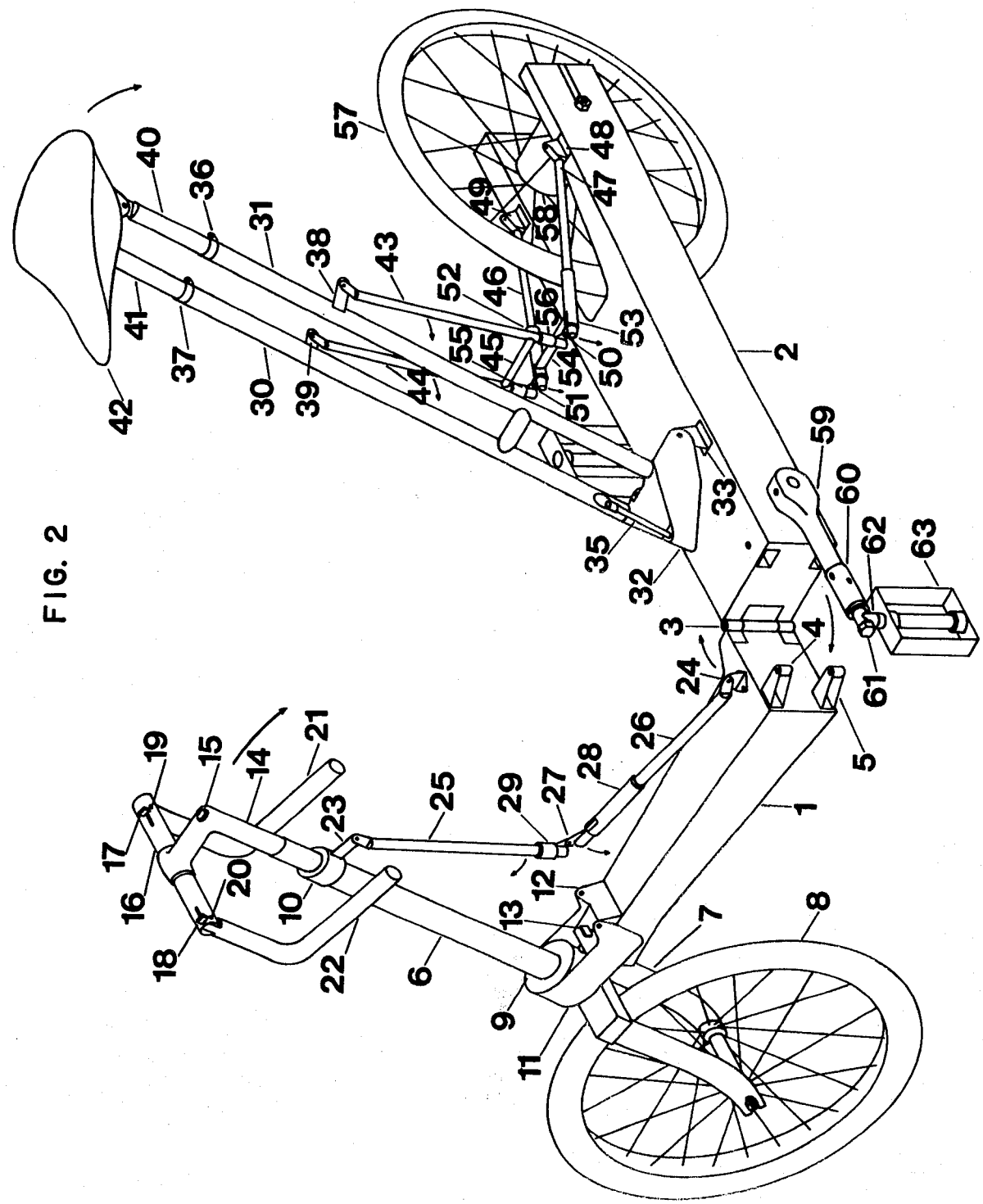
FIG. 2 is a perspective view of the bicycle in the process of being folded.
Figure 3:
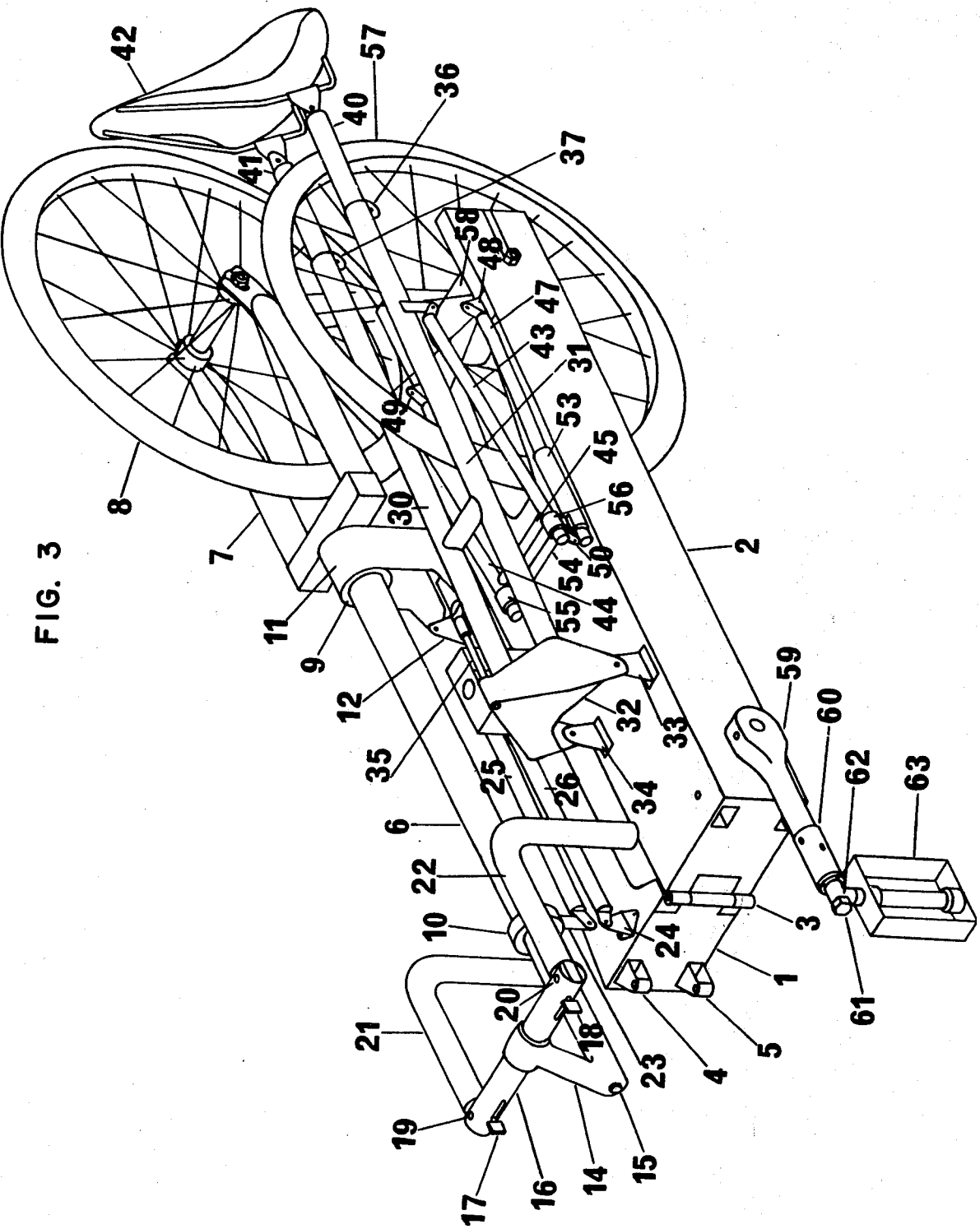
FIG. 3 is a perspective view of the bicycle in a fully folded condition.
Figure 7:
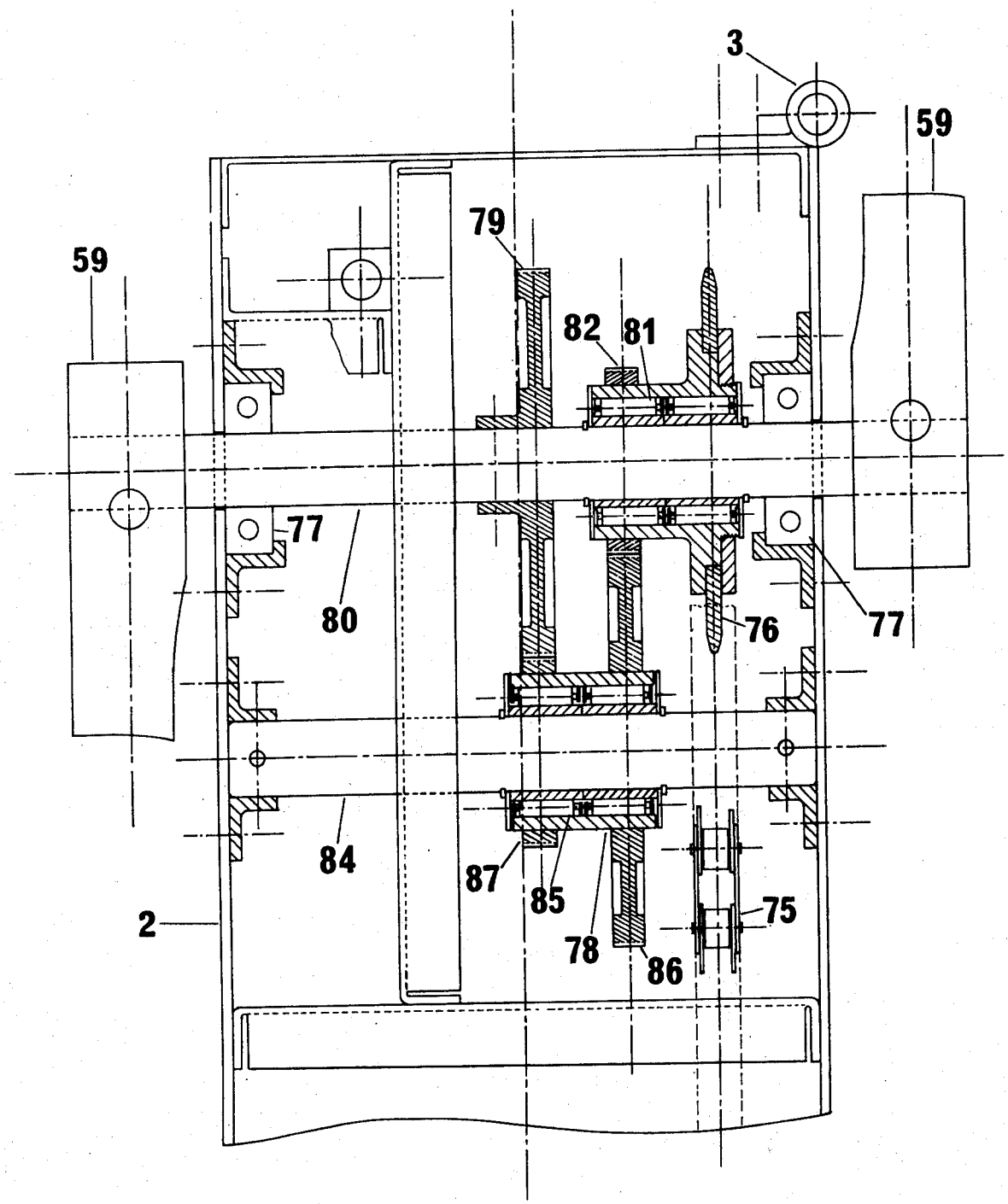
FIG. 7 is a plan view of the drive gear.

The mode of operation to effect folding of the bicycle is as follows:

i. Folding the handlebars. The knobs 17, 18 are drawn towards the central plane of the bicycle, to withdraw the locking plungers 71 from the lugs 72 and the gripping parts 21, 22 then hinge down under their own weight. The gripping parts are kept in the folded position by the locking plungers 71 which exert a small force on the sides of the lugs. In practice, the two knobs 17, 18 can be drawn back simultaneously with one hand.

ii. Folding the front assembly. This requires simultaneous turning movement of the bracket 11 about the common axis with bracket 12, and of the front stay 25, 26 about its hinged connections 23, 24 and 27 (see FIG. 2). The bracket 11 is allowed to pivot by pulling the locking pin 65 out of the hole in the housing 9, using the knob. 13. At the same time, the spring loaded sleeve 28 is withdrawn from its collar 29 allowing the two parts of the front stay to be subject to angular movement as indicated in FIG. 2.

iii. Folding of the main frame 1, 2. When the locking pin 35 is pulled out, the lugs 4, 5 on the front frame part 1 are released, and the part 1 is free to rotate through 180°, about the hinge 3.

iv. Folding of the seat tubes. This requires simultaneous turning movement of the seat tubes 30, 31 with the bracket 32 turning about the common axis with the brackets 33, 34 and of the rear stays about the hinged connections at their ends and at their midpoints (see FIG. 2). The bracket 32 can turn once the locking pin 35 is pulled out. The turning of the two parts of the rear stays is made possible by pulling the cross tube 54 connecting the spring loaded sleeves 52, 53, out of the collars 55, 56.

v. Folding the pedals. Axial movement of the spring loaded sleeve 60 releases the pins positioning the rotatable collar 62 mounted on the spigot 61 at the end of the crank 59. The collar 62, and the pedal 63 attached to it, can then be rotated through 90°, to bring the pedal axis into the central plane. At the same time, the pedal is rotated about its own axis through 90°, to bring it into the central plane (see FIG. 3). The pedal is locked in the folded position by releasing the sleeve 60.

A complete folding operation proceeds in the following way:
 1. Fold the pedals, as described in (v) preceding.
 2. Fold the handlebars, as described in (i) preceding.
 3. Release the locking pin 35; this alows rotation of the front frame part 1. When this rotation has proceeded through 30° or more, the front fork assembly may be completely folded.
 4. Fold the front fork assembly, as described in (ii) preceding.
 5. Fold the seat tubes, as described in (iv) preceding.

A partial folding operation proceeds in the following way:
 1. Release the locking pin 35.
 2. Fold the front frame part 1.
 3. Fold the front fork assembly.
 4. Fold the seat tubes. The handlebars remain unfolded, as do the pedals. The cranks are rotated so that one pedal can fit under the front tube in its folded position.

The mode of unfolding the bicycle is as follows:
 1. Unfold the front frame part 1, at the same time unfolding the front fork assembly. When the front tube is in the correct position, the pin 65 housed inside the front frame part 1 will be pushed forward into the hole in the housing 9. In that position, the two parts of the front stay 25, 26 will come into line and the locking sleeve 28 will move up into the collar 29.
 2. Unfold the seat tubes. When unfolded, push down the locking pin 35. This secures the seat tubes, and also secures the front frame part 1 to the rear frame part 2, by passing through the lugs 4, 5. When the seat tubes are in the correct position, the upper and lower parts of the rear stays come into line, and the locking sleeves 51, 52 move up into the collars 54, 55.
 3. Unfold the pedals. This is done by axial movement of the locking sleeve 60, and its release after a 90° rotation of the pedal axis.
 4. Unfold the handlebars. When the hinged gripping parts 21, 22 are pulled up into the horizontal position, the locking plungers 71 inside the fixed central section 16 are pushed outwards by the springs 70 to engage the lugs.

Unfolding of the partially folded bicycle proceeds in the following manner:
 1. Unfold the front frame part 1, at the same time unfolding the front fork assembly.
 2. Unfold the seat tubes. When unfolded push down the locking pin 35.

The bicycle according to the invention is fitted with caliper brakes, the front brake being mounted in the usual position on the front forks, and the rear brake on the lower surface of the rear frame part 2. The front and rear wheels are provided with standard mudguards. Furthermore, front and rear lights may be mounted on suitably positioned brackets.

In addition, a 50 c.c. engine may be mounted inside the rear frame part 2 in its central section forward of the rear fork. A fuel tank for the engine may be housed in the front frame part 1, and a flexible fuel line provided to connect it to the engine. Furthermore, it will be appreciated that the riding qualities of the bicycle may be improved by incorporating a compression spring arrangement in the housing 9.

From the foregoing, it will be understood that the bicycle of the present invention has the following advantages:

1. It can be folded into very compact dimensions which enables it to be stored in restricted areas such as the trunk of a small car, the luggage rack of a rail carriage, or indeed any other convenient small space.
 2. It is capable of being easily and quickly folded and unfolded without requiring special skills and/or tools.
 3. It can be completely or partly folded to suit requirements. Thus, complete folding using all the means provided reduces the machine to the smallest folded dimensions of which the arrangement is capable. Partial folding on the other hand may be employed if frequent folding and unfolding makes convenience more important than the magnitude of the folded dimensions.
 4. The safety of the rider is ensured by providing for double locking of the main frame members when the bicycle is being ridden. Thus, the members may only be released by specific operations which cannot be effected accidently when the machine is in use.
 5. Since the drive is housed within the confines of the main frame, the possibility of oil and dirt being transferred to the users clothes when the machine is being ridden, or being carried, is reduced to an absolute minimum.

I claim:
 1. A portable foldable bicycle comprising a main frame divided into a front frame part and a rear frame part which are hingedly connected together, a front fork and a steering assembly hingedly connected to the front frame part, a saddle supporting assembly hingedly connected to the rear frame part, and locking means provided in operative association with each of the hinged connections, and in which the front and rear parts of the main frame are of generally box shaped cross section and a hinge pin is arranged adjacent one side thereof to permit the two parts to be positioned side by side in the folded position and including a foldable front stay which is hingedly connected at its ends to the front tube and to the rear end of the front frame part, and in which adjacent inner ends of the front stay are hingedly interconnected and a spring loaded sleeve coacting with a collar is provided to lock the stay in an in line position.
 2. A bicycle as claimed in claim 1, in which a pair of apertured lugs are provided adjacent the opposite side of the front frame part to coact with corresponding openings formed in the rear frame part, the lugs being adapted to receive a locking pin which also passes through coincident holes in the rear frame part.
 3. A bicycle as claimed in claim 2, in which the front fork and steering assembly comprises a fork supporting a front wheel, a front tube fixed to the front fork and supported in a housing attached to the front frame part by means of a pair of coacting hinges positioned to provide a common pivotal axis about which the front fork and steering assembly is adapted to pivot and a pair of handlebars attached to the front tube.
 4. A bicycle as claimed in claim 3, in which the handlebars comprise a stem connected to the front tube and supporting a fixed central portion, and a pair of gripping portions hingedly attached to the fixed portion.
 5. A bicycle as claimed in claim 4, in which the handlebars include locking means which comprise a spring loaded plunger arranged in each end of the fixed por- tion to coact with lugs provided in the ends of the respective gripping portions.

6. A bicycle as claimed in claim 5, in which the plungers are provided with knobs arranged externally of the fixed portion to permit release of the plungers by the user.

7. A bicycle as claimed in claim 6, in which the saddle supporting assembly comprises a pair of spaced seat tubes fixed to a base bracket which is hingedly attached to the rear frame part, and a pair of secondary tubes fitted to the saddle tubes and supporting the saddle.

8. A bicycle as claimed in claim 7, in which the locking pin for locking the main frame parts together also passes through an aperture in the base bracket to lock the saddle supporting assembly in an operable position.

9. A bicycle as claimed in claim 8, in which a foldable rear stay is hingedly connected to the saddle tubes and to the rear frame part.

10. A bicycle as claimed in claim 9, in which the rear stay comprises a first section and a second section hingedly connected together, the first section consisting of a pair of rods interconnected by a transverse cross tube, and the second section consisting of a pair of rods interconnected by a pair of spring loaded locking sleeves adapted to coact with collars on the first section to retain the first and second sections in an in line position.

11. A bicycle as claimed in claim 2, in which the rear end of the rear frame part is bifurcated to present a rear fork supporting a rear wheel.

12. A bicycle as claimed in claim 11, including a pair of pedals each comprising a crank having a spigot at its free end, a rotatable collar mounted on the spigot and supporting a pedal unit, and a spring loaded sleeve for locking the collar in position relative to the spigot.

13. A bicycle as claimed in claim 12, in which drive between the pedals and the rear wheel is provided by a chain and sprocket drive positioned wholly within the rear frame part.

14. A bicycle as claimed in claim 13, in which the drive incorporates a step up gear train.

* * * * *